(12) United States Patent
Choiset

(10) Patent No.: US 6,651,881 B1
(45) Date of Patent: Nov. 25, 2003

(54) CARD, IN PARTICULAR CHIP CARD, READING DEVICE

(75) Inventor: Bruno Choiset, Villiers Saint Frederic (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/380,303

(22) PCT Filed: Dec. 28, 1998

(86) PCT No.: PCT/FR99/02888

§ 371 (c)(1),
(2), (4) Date: Aug. 30, 1999

(87) PCT Pub. No.: WO98/35605

PCT Pub. Date: Jul. 15, 1999

(30) Foreign Application Priority Data

Dec. 30, 1997 (FR) .................................. 97 16697

(51) Int. Cl.$^7$ ................................................ G06K 5/00
(52) U.S. Cl. ...................................................... 235/380
(58) Field of Search ................................ 235/380, 492, 235/475, 476, 477, 482, 486, 10; 150/154, 165

(56) References Cited

U.S. PATENT DOCUMENTS

| | | | | |
|---|---|---|---|---|
| 4,084,214 A | * | 4/1978 | Eppich | 361/394 |
| 4,259,568 A | | 3/1981 | Dynesen | 206/305 |
| 5,015,830 A | * | 5/1991 | Masuzawa et al. | 235/441 |
| 5,088,084 A | * | 2/1992 | Komiya et al. | 369/75.1 |
| 5,310,998 A | * | 5/1994 | Okuno | 235/380 |
| 5,527,122 A | * | 6/1996 | Carter | 400/496 |
| 5,530,234 A | * | 6/1996 | Loh et al. | 235/61 R |
| 5,551,497 A | * | 9/1996 | Stanley | 150/154 |
| 5,927,487 A | * | 7/1999 | Whittle et al. | 206/45.2 |
| 6,016,954 A | * | 1/2000 | Abe et al. | 235/378 |

FOREIGN PATENT DOCUMENTS

| | | | |
|---|---|---|---|
| EP | 0307787 | * | 7/1988 |
| EP | 0793203 | | 9/1997 |
| JP | 64-064086 A | * | 3/1989 |
| JP | 05-233475 S | * | 9/1993 |

* cited by examiner

Primary Examiner—Diane I. Lee
(74) Attorney, Agent, or Firm—Edward J. Kondracki; James T. Carmichael; Miles & Stockbridge P.C

(57) ABSTRACT

The invention relates to a card (7) reading device (1) comprising a housing (10) equipped with a keyboard (5), a display unit (4), a slot (8) for inserting a card (7) into the housing (10) and a cover (2) adapted to be pivoted between an open and closed position for protecting the keyboard (5) and the display unit (4), when in the closed position. The cover (2) includes an integral flap (6) and is attached to the housing (10) by an articulating element (3) that allows it to pivot between the closed position and open position and be brought into position underneath the housing (10) in the open position. The flap (6), which covers the insertion slot (8) when the cover (2) is closed, serves as a support base when in the open position to incline the housing (10) when the reading device is placed on a support surface such as desk or table.

21 Claims, 4 Drawing Sheets

CARD, IN PARTICULAR CHIP CARD, READING DEVICE

BACKGROUND OF THE INVENTION

1. Field of the Invention

The present invention relates to a card reading device, particularly a chip card reader.

Within the scope of the invention, the term "card" should be understood in its most general sense: magnetic stripe card, "smart" card, "chip" card, etc. It should also be understood that the term "card reader" is generic: it relates to any device that can read and/or write onto cards of the aforementioned types.

Likewise, the applications of these cards are quite diverse: banking or similar applications, electronic purses, security badges, etc. In France, in particular, it is customary to provide all those eligible for social security with a short- or intermediate-term "chip" card storing a certain amount of information of a medical and/or administrative nature.

2. Description of Related Art

For about twenty years or so, these various types of cards, particularly the cards equipped with an "electronic chip," i.e., with a controller or microprocessor associated with storage circuits, have been widely used, and they play an increasingly large part in the daily lives of individuals.

International standards govern the various parameters associated with the cards: dimensions, location of the magnetic stripe, location of the "chip" and location of the input-output interfaces (connections). Meanwhile, the computing power of the electronic circuits as well as the quantity of information stored have sharply increased.

The input-output connections allow two-way transmissions between the card and various types of card readers, whether they be card readers associated with stationary devices (cash dispensers, automated teller machines (ATMs) ATMs, devices incorporated into an electronic cash register or a microcomputer, etc.) or portable, point-of-sale terminals such as a payment terminal (restaurants, various stores) or a medical terminal.

All these devices have at least one characteristic in common, i.e., an insertion slot or aperture into which the card is inserted for purposes of a write and/or read operation. This slot opens directly to the external environment and is large enough to allow the penetration into the housing of the card reader of small metal objects such as paper clips, or more simply, particles or dust. The entry of such elements is even easier, and thus more frequent, when the card reader is a portable terminal capable of being moved to various places that are, a priori, unprotected.

A card reader comprises electronic circuits and mechanical elements that are extremely miniaturized. The objects or polluting particles that may penetrate the card reader insertion slot are therefore capable of creating malfunctions, or even damaging some of these elements or circuits.

The devices of the above-mentioned type, especially the portable devices, or at least the portable devices, have other drawbacks.

First of all, the general ergonomics of these devices are not optimal. In particular, card readers of the type that can be placed in the pocket of a garment must be as thin as possible and are generally in the shape of a rectangular parallelipiped. When they are placed on a table, it is relatively difficult to insert the card into the slot, and the access to the keys of the keyboard is not optimal, either.

Secondly, it often happens that the user forgets to remove his card after use, particularly after he has entered his confidential code by means of the keyboard. The card can remain inside the card reader without the card holder's noticing it, especially if the card reader is equipped with a cover.

SUMMARY OF THE INVENTION

The object of the invention is to provide a card reader, particularly of a chip card, that eliminates the defects of the devices of the prior art, some of which have just been mentioned.

To this end, the card reader according to the invention, which includes a cover for protecting the keys of the keyboard and its display unit, is equipped with a flap integral with the cover that covers the insertion aperture when the device is not in use, which prevents the entry of undesirable elements into the device, even if the device is moved into a polluted environment.

In a preferred variant of the invention, the card reader is provided with a configuration such that it can be presented to a user so as to be inclined, which facilitates its handling and, in particular, the entry of a confidential code.

In another preferred variant of embodiment, arrangements are provided so that the flap cannot be in the closed position as long as the card is present in the device, which prevents the device from being closed without removing the card.

Hence, the subject of the invention is a card reading device, particularly for a chip card, comprising a housing equipped with data entry and display means, with a slot for inserting said card into the housing and with a cover protecting these data entry and display means, in a so-called closed position, characterized in that it comprises a flap integral with said cover and disposed so that it covers said insertion slot when the cover is in said closed position.

BRIEF DESCRIPTION OF THE DRAWINGS

The invention will be better understood, and other characteristics and advantages will emerge with the reading of the following description in reference to the attached figures, in which.

DESCRIPTION OF THE PREFERRED EMBODIMENT(S)

An exemplary embodiment of a card reader according to the invention will now be described in connection with FIGS. 1 through 5.

Figure 1:
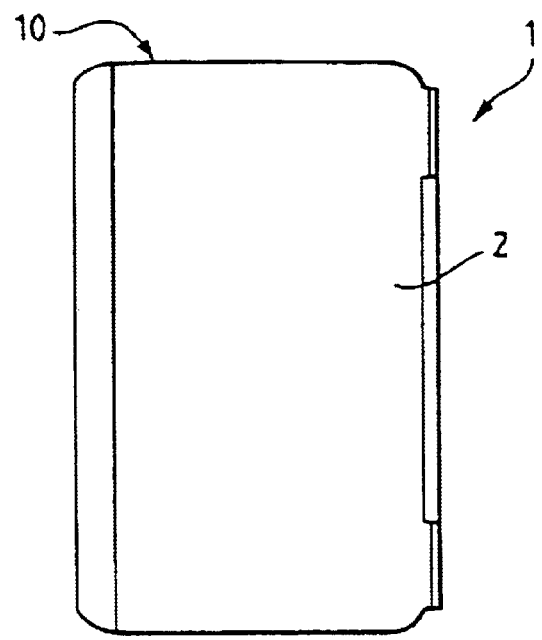
FIG. 1 represents, in a top view, an exemplary embodiment of a card reader according to the invention, in the closed position.
Figure 5:
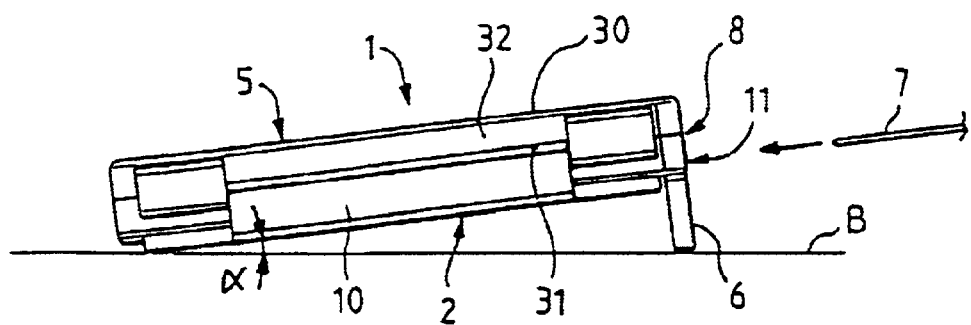
FIG. 5 is a side view of the card reader, in the open position, placed on a flat surface.
Figure 2:
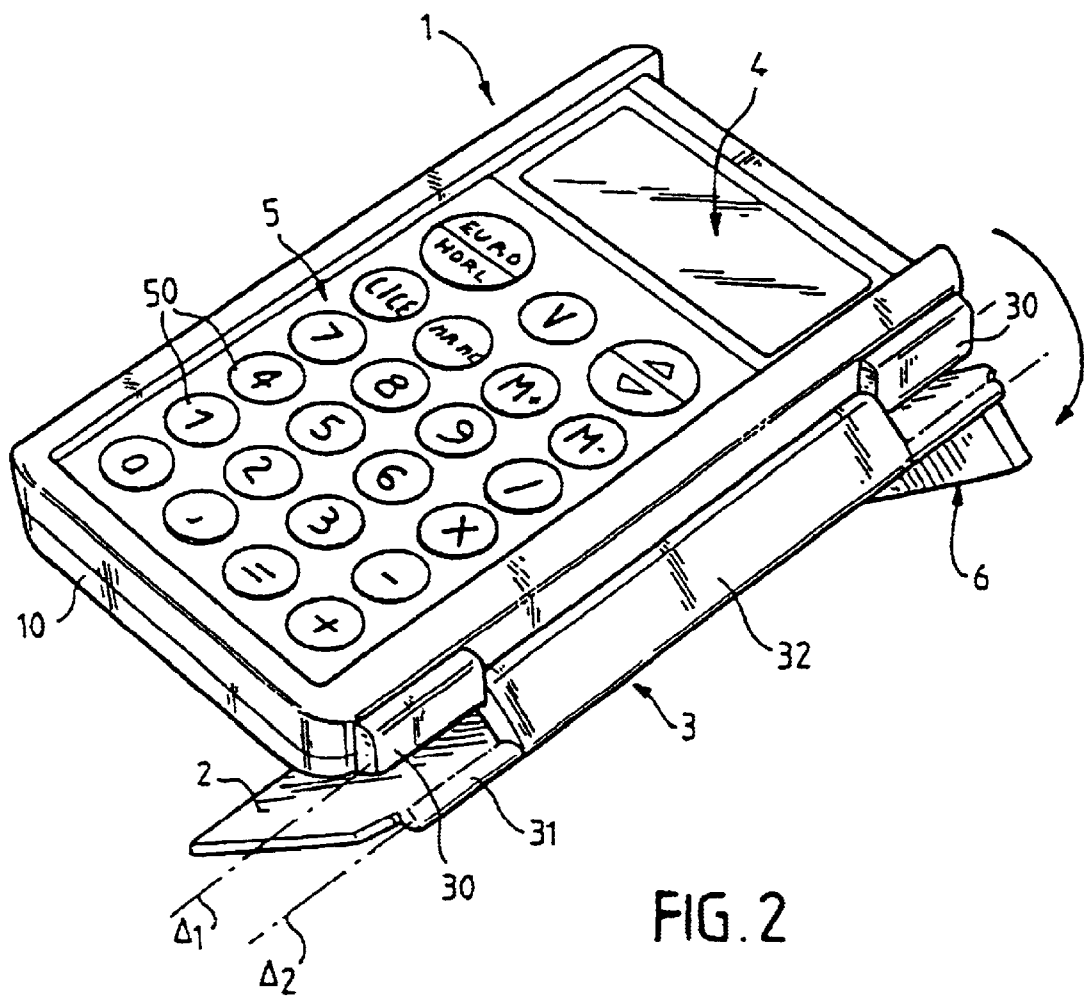
FIG. 2 represents, in perspective and in a three-quarter top view, this same card reader in a semi-open position.

FIG. 1 illustrates the card reader 1 in the closed position (top view), and FIG. 2 (three-quarter top view in perspective) illustrates this same card reader in a position that will be called semi-open. In effect, the housing 10 of the card reader is equipped with a protective lid or cover 2. The latter is attached to the housing 10 by means of a hinge joint 3 disposed along one of the walls of this housing 10. More precisely, this joint comprises a double hinge, 30 and 31, whose operation and function will be described in detail below.

A card reader normally comprises a display unit 4, most often a liquid crystal display, and a data entry element constituted by a keyboard 5, and keys 50 (alphanumeric keys and function keys). The protective cover 2, in the example described, completely covers the keyboard 5 and the display unit 4 when it is in the closed position.

As has been indicated, the joint 3 comprises two hinges: a first hinge 30 that mechanically couples the housing 10 to a first edge of an intermediate piece 32, and a second hinge that mechanically couples a second edge of this intermediate piece 32 to the protective cover 2.

The intermediate piece 32 has the shape of a rectangular parallelipiped whose width is equal to half the width of the wall (the right wall in FIG. 2) of the housing 10 to which it is attached via the hinge 30. The hinge 30 is attached to the housing 10 along an axis Δ1, parallel to the side edge of the housing 10 and located at mid-height of the attaching wall.

These arrangements allow a rotation of the intermediate 3 piece 32 around the axis Δ1, and a rotation of the protective cover around a second axis Δ2, parallel to the first one. It follows that the protective cover 2 can be folded under the housing 10 of the card reader 1, in the fully open position. A latch (not represented) holds the cover 2 in the closed position (FIG. 1).

For example, the cover 2 can be made of rigid plastic. The intermediate strip 32 is advantageously made of a rigid material, for example also of plastic.

According to a first variant of embodiment (not illustrated), the cover 2 is mechanically coupled to the housing 10 by an articulated element consisting of a strip of plastic comprising weakened areas (grooves, for example) that make it possible to fold it in these areas. This strip therefore fulfills the function of the double hinge 3 described above and allows the cover 2 to be folded down and folded back underneath the housing 10, as above.

According to a second variant of embodiment (not illustrated), the double hinge 3 is replaced by an articulated element consisting of a simple strip of flexible material. In this case, this strip also fulfills the function of the double hinge 3 described above, and allows the cover 2 to be folded down and folded back underneath the housing 10, as above.

According to a first important characteristic of the invention, the card reader 1 is equipped with a movable mask or flap 6 with a flat configuration. The shape of the flap 6 may be seen in FIG. 2. The cover 2 is also essentially flat. The planes formed by the cover 2 and the flap 6 are approximately perpendicular to one another.

Figure 3:
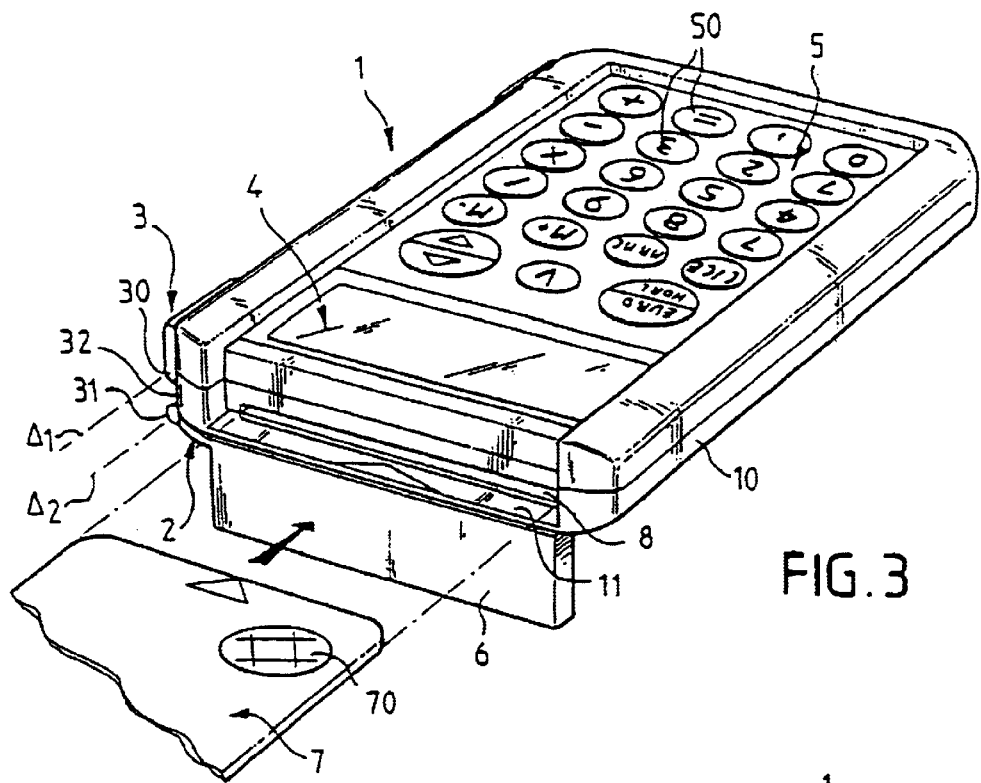
FIG. 3 shows a rear view of the card reader, in the open position, as well as a chip card in the process of being inserted.

FIG. 3 represents (rear view in perspective) the card reader 1, in the fully open position. Also represented in FIG. 3 are a card 7 comprising a chip 70, of a conventional model, that can be used within the scope of the invention. Also seen in this FIG. 3 is an aperture or slot 8 for inserting the card 7 into the housing 10 in order to be read and/or written on.

To facilitate the above-mentioned insertion, the housing 10 can be extended at the back by a lower plate 11, which serves as a guide during this insertion operation and supports the card 7 once inserted.

Figure 4:
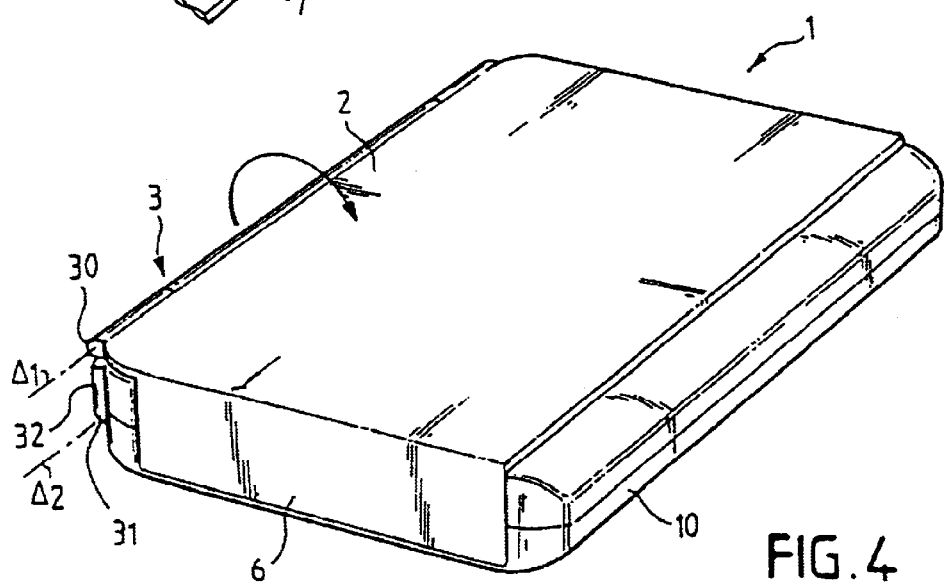
FIG. 4 shows a rear view of the card reader of FIG. 1, in the closed position.

FIG. 4 illustrates a rear view of the card reader, but with the protective cover 2 completely closed. In this position, it covers and protects the keyboard and the display unit 4. It will also be noted that, according to an important characteristic of the invention, the flap entirely covers the slot 8 and as a result, prevents any introduction of a objects and miscellaneous particles.

A priori, the flap 6 is made of a rigid material such as a plastic, but can also be made of a flexible material such as rubber that adapts to the exact shape of the wall comprising the insertion slot 8.

Other advantageous characteristics of the invention will now be described.

First, in a preferred embodiment of the invention, as a result of the particular arrangements adopted for the hinge system, or the articulated element that fulfills its function in the additional embodiments, the protective cover 2 can be folded all the way under the housing 10. It follows, as seen in FIG. 3 but even more clearly in FIG. 5 (side view), that since the flap 6 is integral with the cover 2, it accompanies its movement when the latter is completely opened. It also ends up under the housing 10, and as a result, it doubles the thickness of the housing 10 of the card reader 1 at the level of the reading slot 8. If the card reader 1 is placed on a flat surface (the practitioner's desk B, for example), it serves as a support base at the level of the slot 8. The housing 10 of the card reader 1 rests so as to be inclined (angle α on the order of 15 to 20 degrees with the plane of the desk B), which facilitates the insertion of the card 7 into the slot 8 (at the back in the example described) and the access to the keyboard 5 (for example so that the patient can enter his confidential code). It also provides better perceptibility of the display of the data (improved angle of incidence).

Secondly, when the card 7 is present in the slot 8, it becomes impossible to close the cover 2. In fact, in a preferred embodiment, the depth of the insertion slot 8 is smaller than the maximum length of the chip card 7. It follows that the card 7 projects outward from the housing 10, even though it is inserted normally into the reading slot 8, which does not interfere with the normal read and/or write operations. For example, the length of the projection is about 2 cm. In the presence of the chip card 7, the user of the card reader 1 cannot close the card reader 1, since the cover comes to rest against the card 7. It must therefore of necessity be removed in order to be returned to its holder.

Figure 8:
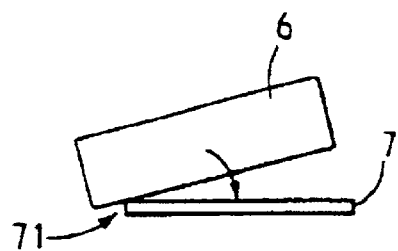
FIG. 8 is a view illustrating an operational detail of the card reader according to the invention.

In the variants that have just been described, the double hinge 3, or the element that fulfills its function, are disposed on the right or left side of the housing 10. This disposition allows one drawback to remain, as illustrated schematically by FIG. 8. In effect, when the cover 2 is closed, if the card 7 is still inserted in the slot 8, the cover 2 exerts a shearing force on its edge 71, since it acts like a blade.

Figure 6:
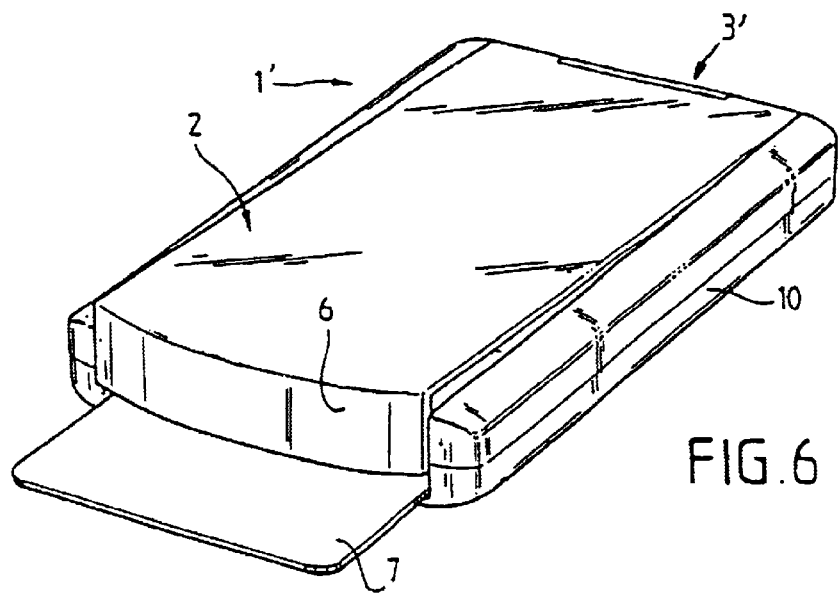
FIGS. 6 and 7 illustrate, in perspective and seen from the rear, a variant of embodiment of the card reader according to the invention.
Figure 7:
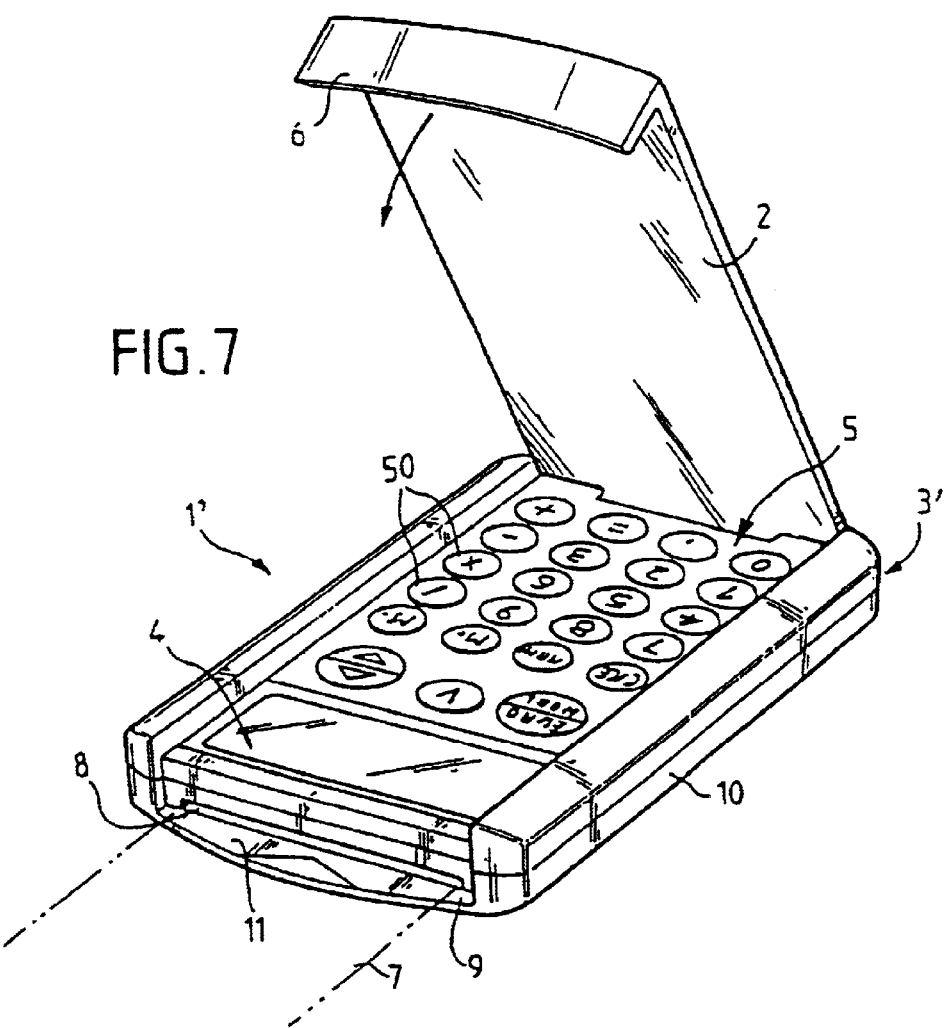

In an additional variant illustrated by FIGS. 6 and 7, instead of disposing the double-hinge joint on the long side of the housing of the card reader, it is located on what is referred to as the "front" of the housing 10, i.e., on one of the short sides.

In FIGS. 6 and 7, the card reader is referenced 1' and the double-hinge joint 3'. The elements common to the preceding figures have the same references and will be described again only as necessary.

This disposition is advantageous because, if the double-hinge joint 3' is located on the front of the housing 10, when attempting to close the flap 6 while the card 7 is present, (as shown more particularly in FIG. 6) in the reading slot 8, the flap 6 butts against the entire width of the card 7. It follows that it cannot break it, even if forced.

Finally, the housing 10 can advantageously be equipped with a switch or a similar element 9, operated by the flap 6. This switch 9 is disposed on the wall equipped with the slot 8 for inserting the card 7 and cuts off the electric power supply of the electronic circuits present in the housing 10 (not represented) when the flap 6 is in the fully closed position, and automatically re-establishes this supply when the cover 2 is opened, and hence when the flap 6 is moved away.

Naturally, this advantageous switch disposition is compatible with the first embodiment described in connection with FIGS. 1 through 6, even though the switch 9 has not been explicitly represented in these figures.

Finally, for certain applications, it is not necessary to return the card 7 to its holder after use, and it can remain in the reading slot 8 without any drawbacks. For this type of application, it may on the contrary be advantageous to keep it in the reading slot 8. To this end, a slot 8 is provided that is deep enough to completely "swallow" the card 7. In other words, the length of the slot 8 must be at least equal to the maximum length of the card 7. Thus, the latter remains protected inside the reading slot 8. In fact, it is held inside by the flap 6 when the cover 2 is closed, so that the housing 10 serves as a protective case.

With the reading of the above, it is easy to see that the invention clearly achieves the objects set forth.

The presence of the flap, when the card reader is not in service and the cover is closed, prevents any entry of undesirable elements, particularly small metal objects such as paper clips, or even dust and miscellaneous particles, and more generally any element that is dangerous to its proper functioning.

Furthermore, because of the "support base" function fulfilled by the flap when the cover is completely open, it allows for better ergonomics, since the housing is in an inclined position.

Finally, according to a first variant, the flap makes it impossible to leave the card inside the housing when the cover is closed, or conversely, in a second variant, when the reading slot is deep enough for the card to be fully inserted into the housing, the flap prevents the intrusion of elements that are dangerous to the card (especially to its chip), and together with the housing, contributes to forming a protective case for this card.

It should be clear, however, that the invention is not limited to only the exemplary embodiments explicitly described, specifically in relation to FIGS. 1 through 8.

The materials that can be used are essentially tied to the specific application intended and are determined by a simple technological choice within the capability of one skilled in the art.

Likewise, the terms "under," "top," "front," "sides," or "back" relative to the housing are purely arbitrary. Lastly, the slot for inserting the card can be placed not only at the back as has been described, but on any lateral wall. The flap need only be positioned relative to the cover so that this slot is obstructed when the cover is closed.

Nor is the invention limited to applications using chip cards. On the contrary, the card can be of any type whatsoever: magnetic card, mixed card (chip and magnetic stripe), piezoelectric card, etc.

Moreover, the card reader can be applied to the following additional functions: calculator, electronic calendar, etc., accessible via the keys of the keyboard and the display unit.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A card reading device comprising:
   a housing including several walls;
   a first wall of the several walls having a data entry keyboard and a display;
   a second wall of the several walls having a slot arranged for receiving a card therein;
   a one-piece cover being affixed to the housing and disposed such that the cover is positionable between a closed position and an open position, the cover protecting the data entry keyboard and the display when in the closed position; and
   a flap integral with the cover and disposed such that when the cover is in the closed position the flap conceals the slot and when the cover is in the open position the cover provides a support for the housing to support the housing at an angle relative to a support surface.

2. A device according to claim 1, wherein the housing has a third wall and the cover folds under the wall of the housing when in the open position, such that the flap provides a support base for the housing at the level of the slot.

3. A device according to claim 2, wherein the slot has a depth smaller than the maximum length of a card to be inserted in the slot, so that the cover cannot be positioned in the closed position as long as the card remains in the slot.

4. A device according to claim 2, wherein the slot has a depth at least equal to the maximum length of a card to be inserted therein, so that presence of the card in the slot does not prevent the closing of the cover and so that the housing provides a protective case for the inserted card when the cover is in the closed position.

5. A device according to claim 2, wherein the housing further includes a plate extending from the second wall for guiding a card during insertion of the card into the slot.

6. A device according to claim 2, further comprising:
   electronic circuits disposed within the housing; and
   a switch on the second wall of the housing,
   wherein the switch is disposed so as to be actuated by the flap when in a predetermined position to control application of electric power for the electronic circuits.

7. A device according to claim 1, wherein the flap and the cover are substantially flat and are disposed in planes that are approximately perpendicular to one another.

8. A device according to claim 7, wherein the cover is mechanically coupled to the housing by an articulated element configured to allow the cover to abut the housing in the closed position and to fold under a third wall of the housing in the open position.

9. A device according to claim 8, wherein:
   the articulated element generally is a rectangular parallelepiped of a predetermined width having a first hinge on a first edge of the articulated element and a second hinge on a second edge of the articulated element, the second edge being substantially parallel to the first edge;
   the first hinge mechanically couples the articulated element to the housing; and the second hinge couples the cover to the articulated element.

10. A device according to claim 8, wherein the slot has a depth smaller than the maximum length of a card to be inserted therein, so that the cover cannot be positioned in the closed position as long as the card remains in the slot.

11. A device according to claim 8, wherein the slot has a depth at least equal to the maximum length of a card to be inserted therein, so that presence of the card in the slot does not prevent the closing of the cover and so that the housing provides a protective case for the inserted card when the cover is in the closed position.

12. A device according to claim 8, further comprising:

electronic circuits disposed within the housing; and a switch on the second wall of the housing, wherein the switch is disposed so as to be actuated by the flap when in a predetermined position to cut off or re-establish an electric power supply for the electronic circuits.

13. A device according to claim 1, wherein the cover is mechanically coupled to the housing by an articulated element configured to allow the cover to cover the housing in the closed position and to fold under a third wall of the housing in the open position.

14. A device according to claim 13, wherein:

the articulated element is generally a rectangular parallelepiped of a predetermined width having a first hinge on a first edge of the articulated element and a second hinge on a second edge of the articulated element, the second edge being substantially parallel to the first edge.

15. A device according to claim 14, wherein:

the first hinge mechanically couples the articulated element to the housing; and the second hinge couples the cover to the articulated element.

16. A device according to claim 15, wherein:

the housing is a rectangular parallelepiped wherein the third wall is opposite the first wall, and further including a fourth wall, the fourth wall being perpendicular to and joining the first and third walls;

the articulated element is a strip of rigid material having a width substantially equal to half of a distance between the first and third walls;

the first hinge is attached to the fourth wall in a middle region thereof, so that the cover folds under the third wall of the housing, when the cover is in the open position.

17. A device according to claim 14, wherein:

the housing is generally a rectangular parallelepiped wherein the third wall is opposite the first wall and further including a fourth wall, the fourth wall being perpendicular to and joining the first and third walls;

the articulated element is a strip of rigid material having a width substantially equal to half of a distance between the first and third walls; and the first hinge is attached to the fourth wall in a middle region thereof, so that the folds under the third wall of the housing, when the cover is in the open position.

18. A device according to claim 1, wherein the slot has a depth smaller than the maximum length of a card to be inserted therein, so that the flap is obstructed and the cover cannot be positioned in the closed position as long as the card remains in the slot.

19. A device according to claim 1, wherein the slot has a depth at least equal to the maximum length of a card to be inserted therein, so that presence of the card in the slot does not prevent the closing of the cover and so that the housing provides a protective case for the inserted card when the cover is in the closed position.

20. A device according to claim 1, wherein the housing further includes a plate extending from the second wall for guiding a card during insertion of the card into the slot.

21. A device according to claim 1, further comprising:

electronic circuits disposed within the housing; and a switch on the second wall of the housing, wherein the switch is disposed so as to be actuated by the flap when in a predetermined position to control application of electric power for the electronic circuits.

* * * * *

UNITED STATES PATENT AND TRADEMARK OFFICE
CERTIFICATE OF CORRECTION

PATENT NO. : 6,651,881 B1 Page 1 of 1
DATED : November 25, 2003
INVENTOR(S) : Bruno Choiset It is certified that error appears in the above-identified patent and that said Letters Patent is hereby corrected as shown below:

Title page,
Item [86], "PCT/FR99/02888" should be -- PCT/FR98/02888 --.

Signed and Sealed this

Seventh Day of September, 2004

JON W. DUDAS
*Director of the United States Patent and Trademark Office*